May 26, 1970        R. L. DILLS        3,514,578
COMBINATION BROILER OVEN AND KITCHEN VENTILATING HOOD
Filed Dec. 18, 1968        3 Sheets-Sheet 1
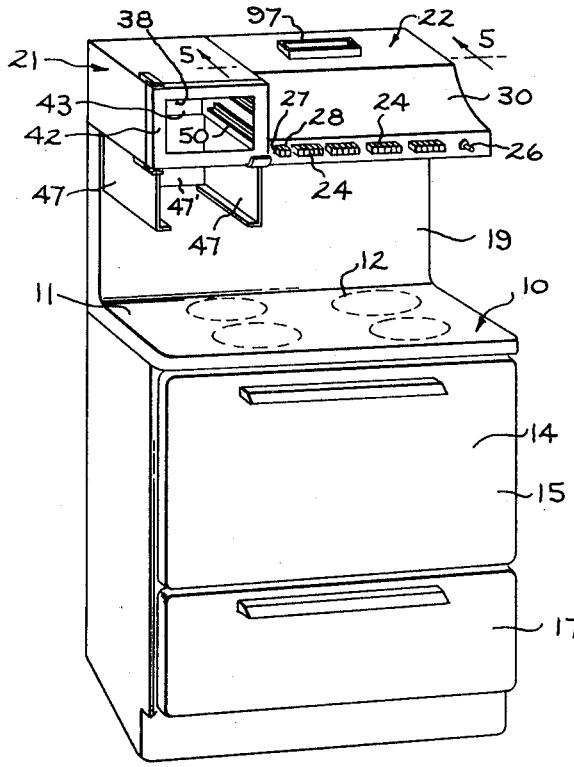
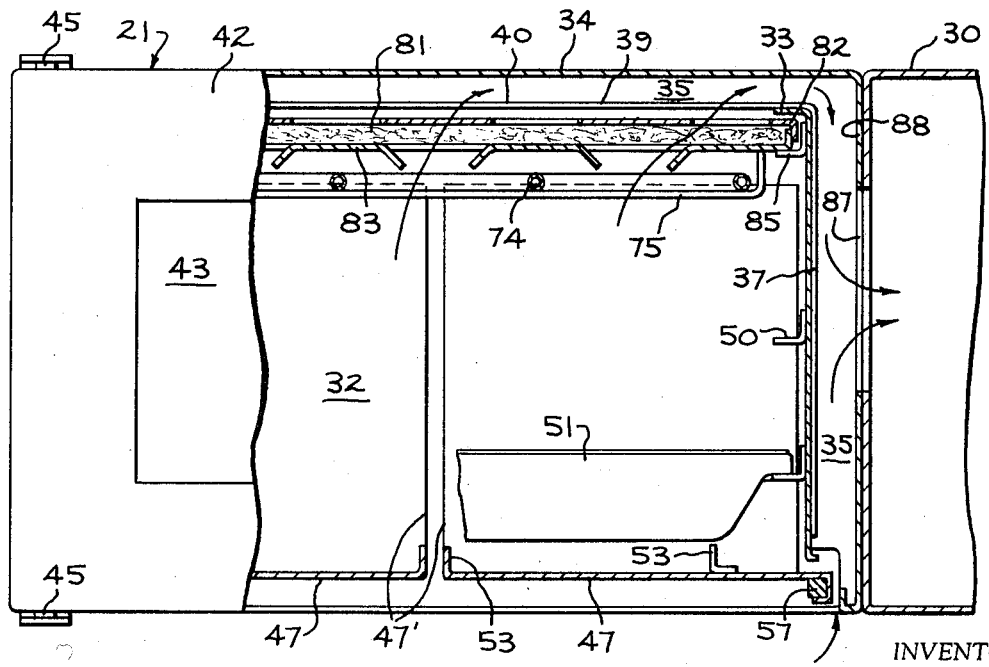
INVENTOR.
RAYMOND L. DILLS
BY Richard L. Caslin
HIS ATTORNEY May 26, 1970 R. L. DILLS 3,514,578
COMBINATION BROILER OVEN AND KITCHEN VENTILATING HOOD
Filed Dec. 18, 1968 3 Sheets-Sheet 3

INVENTOR.
RAYMOND L. DILLS
BY Richard L. Cashin
HIS ATTORNEY

United States Patent Office 3,514,578
Patented May 26, 1970

3,514,578
COMBINATION BROILER OVEN AND KITCHEN VENTILATING HOOD
Raymond L. Dills, Louisville, Ky., assignor to General Electric Company, a corporation of New York
Filed Dec. 18, 1968, Ser. No. 784,753
Int. Cl. F24c 15/20, 15/32
U.S. Cl. 219—400
16 Claims

ABSTRACT OF THE DISCLOSURE

The invention of a side-by-side broiler oven and ventilating hood is shown as an integral part of a high-rise backsplash of a domestic range. The bottom wall of the oven is formed by a pair of panels each hingedly connected at the bottom edge of the opposite sidewall of the oven liner. These panels have a first horizontal position substantially closing the bottom of the oven liner, and a second vertical position serving as a downward extension of the oven liner and creating an open bottom to an enlarged cooking cavity. A broiler pan is adapted to be supported from the vertically hanging panels for supporting the food to be cooked. The oven has an exhaust vent that opens into the ventilating hood whereby the hood is capable of drawing air both from the area above the cooktop of the range as well as from the broiler oven.

CROSS-REFERENCE TO RELATED PATENTS

The closest prior art known to the present inventor appears to be the Turner et al. Pat No. 3,233,606 which shows a cooking appliance comprising a cooktop with a side mounted oven and an overhead ventilating hood which is capable of drawing air both from the area above the cooktop as well as from the oven and exhausting it to the outside of the kitchen.

BACKGROUND OF THE INVENTION

Many housewives prefer the use of two ovens in the kitchen; one a large oven and the other a smaller oven. Where there are two ovens in the kitchen, the smaller oven could be a special broiler oven. However, in many modern homes today there is not space for a freestanding 40" range with double ovens at the sacrifice of less counter and cabinet space. The kitchen ventilating hood market is rapidly increasing. One big advtntage of such a hood is to remove the smoke, odors and vapors generated during an open door broiling operation. It is felt that a closer coupling between the boiler oven and the ventilating hook would completely solve the smoke, odor and grease problem. A small cavity broiler oven will not satisfy the actual needs, and a large broiler attached to the hood is undesirable for appearance and space reasons.

The principal object of the present invention is to provide a small but expandable broiler oven in combination with a kitchen ventilating hood, where the hood is capable of drawing air from both the oven as well as from an area beneath the hood.

A further object of the present invention is to provide a broiler oven with an expandable bottom wall which may be opened downwardly and serve to support a broil pan.

A further object of the present invention is to provide the expandable bottom wall of a broiler oven with a counterbalance mechanism for holding the bottom wall in either a first horizontal or closed position and a second vertical or open position.

A further object of the present invention is to provide a combined broiler oven and ventilating hood of the type described with a grease filter means across the oven exhaust vent where said means is also provided with heat reflecting surfaces which shield the filtering means from the radiant energy of the heating means as well as direct such radiant energy downwardly toward the food to be cooked.

A still further object of the present invention is to provide a combined broiler oven and ventilating hood of the class described where the hood fan draws cooling air around the oven liner and cools the walls thereof and prevents food soil and grease spatter from burning onto the walls so as to facilitate the ease of cleaning the walls.

SUMMARY OF THE INVENTION

The present invention, in accordance with one form thereof, relates to a combined broiler oven and kitchen ventilating hood where the broiler oven is formed as an integral part of the hood and has a cooking cavity with a movable bottom wall that is capable of relocation into vertical hung segments which create an extended cooking cavity with an open bottom. A removable food-supporting shelf is adapted to be supported from the opposite sidewalls of the oven liner, and a removable broil pan is adapted to be supported from the vertical hung segments of the movable bottom wall. The oven has an exhaust vent that is open to the ventilating hood such that the hood may draw air both from the broiler oven as well as from the area beneath the hood.

BRIEF DESCRIPTION OF THE DRAWINGS

My invention will be better understood from the following description taken in conjunction with the accompanying drawings and its scope will be pointed out in the appended claims.

FIG. 1 is a front, perspective view of a free-standing domestic range equipped with a high-rise backsplash which incorporates a combined broiler oven and kitchen ventilating hood suspended from the top portion thereof.

FIG. 2 is a front, elevational view of the broiler oven on an enlarged scale with parts broken away and others in cross-section to shown the internal construction of the oven.

DESCRIPTION OF THE PREFERRED EMBODIMENTS

Figure 3:
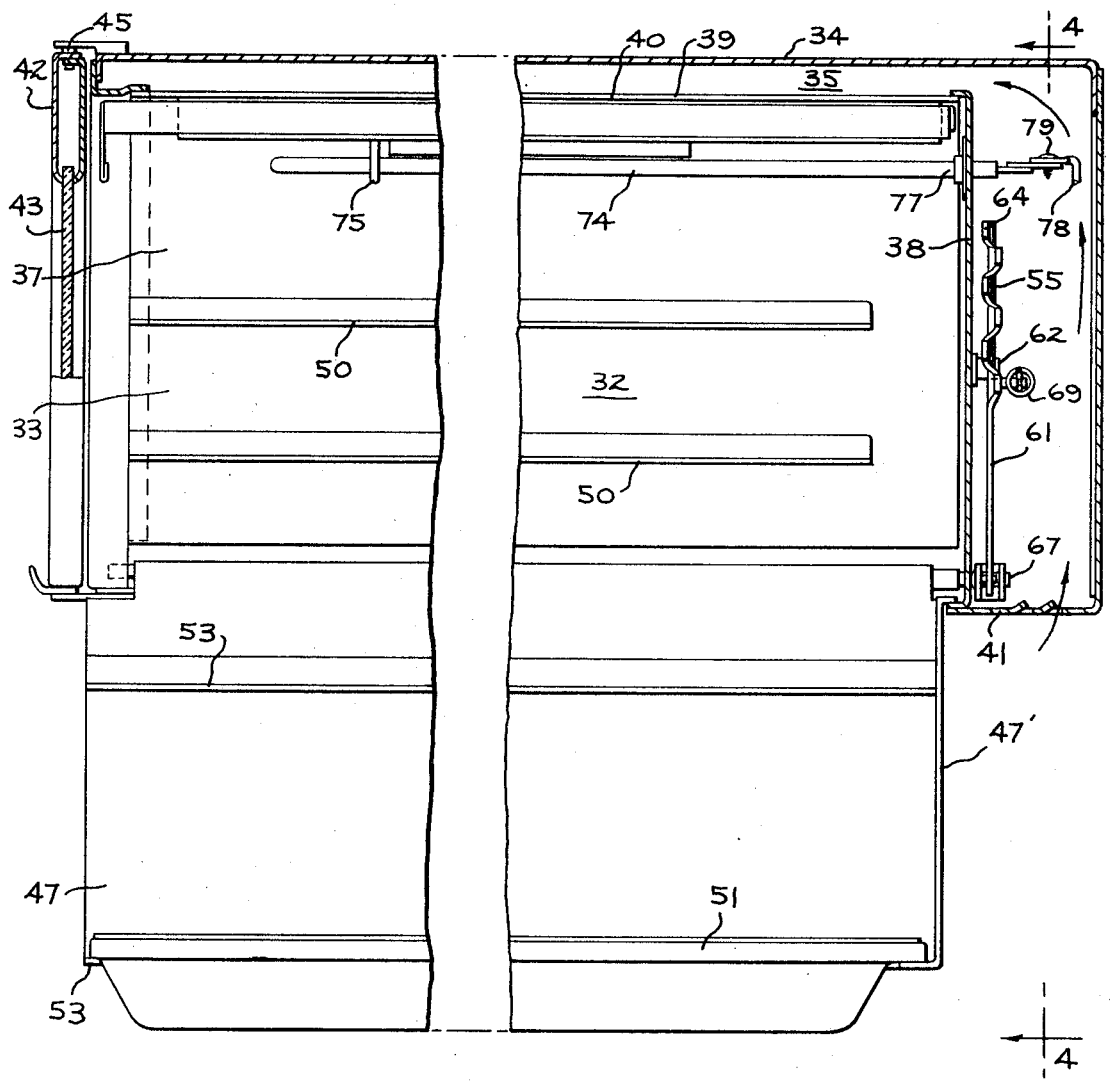
FIG. 3 is a cross-sectional, right side elevational view generally through the center of the oven of FIG. 2 except that the two movable panels forming the bottom wall of the oven liner having been shifted to their vertical hanging positions.

Turning now to a consideration of the drawings, and in particular to FIG. 1, there is shown for illustrative purposes a free-standing domestic range 10 having a top cooking surface 11 with a plurality of surface heating means 12 such as coils of metal sheathed, electrical resistance heating elements, a master oven 14 located beneath the cooktop 11 and provided with a front-opening access door 15. A utensil drawer 17 is provided beneath the master oven 15 for storing pots and pans. The back edge of the cooktop 11 is provided with a high-rise backsplash 19 which is generally of flat sheet metal construction and has assembled along its top edge a combined broiler oven 21 and a kitchen ventilating hood 22. This combined unit is suspended over the cooktop 11 so that the bottom of the broiler oven 21 may be expanded by lowering a portion of the oven so as to increase the size of the oven cooking cavity. Moreover, the broiler oven is vented through the hood 22 such that the hood is capable of drawing the air from both the broiler oven as well as from the area above the cooktop before discharging the air from the hood to the exterior of the kitchen.

Notice that the front edge of the ventilating hood 22 is shown provided with control means for the entire range such as multiple selector switches 24 for governing the surface heating elements 12, as well as a combined oven selector switch and thermostat 26 for the master oven 14. There is also a control switch 27 for the broiler oven 21 and a motor speed control switch 28 for the hood.

A better understanding of the broiler oven 21 can be gained by a study of the enlarged front view of FIG. 2. The broiler oven 21 may either be a separate element attached to one end of the ventilating hood 22 or it could be an integral part of the outer sheet metal housing 30 of the hood. This is merely dependent upon the volume of production. If the volume is relatively high, it probably would be more economical to buy the tools for making the oven and hood as a single unit. However, if the volume is relatively low then it might be more economical to use a standard ventilating hood 22 and add the broiler oven 21 to one side thereof.

The oven 21 has an oven cooking cavity 32 formed by a box-like oven liner 33 that fits into an outer housing 34 and leaves an air channel 35 around the opposite sides 37 and the back 38 and across the top 39 of the oven liner. The top wall 39 is provided with a large rectangular opening which serves as an oven exhaust vent 40. The front of the box-like oven liner 33 is open, and it is adapted to be closed by a side-swinging access door 42 which is shown as having a viewing window 43 with a single glass pane. The hinge axis of the door 42 is shown along the left side edge of the door as at 45 and it is established by brackets connected to the front of the housing.

The means for supporting the oven liner 33 within the outer housing 34 of the oven is not specifically shown, but the oven liner 33 would be provided with a front flange (not shown) that closes the front of the air channel 35. Moreover, there would be fastening screws connecting this front flange to supporting brackets on the outer housing 34. The rear of the oven liner is seated on a lower ledge 41, as is best seen in the side view of FIG. 3.

The bottom of the oven liner 33 is open, in that it has no fixed bottom wall. However, it is provided with a pair of hinged panels 47, 47 which are supported along the two sides of the oven adjacent the bottom edge of the sidewalls 37 so as to have a first horizontal or closed position as shown in FIG. 2, and a second vertical or open position as is shown in FIG. 1 and the side view of FIG. 3. Thus, the broiler oven 21 is expandable in that it has two sizes; namely, a small size as shown in FIG. 2 when the bottom hinged panels 47, 47 are in their horizontal, closed position and a second enlarged size when the panels 47 are in their vertical or open position. The opposite side walls 37, 37 of the oven liner are provided with shelf support means 50 in the form of rails or ledges for supporting a food-supporting device such as a wire rack or a broiler pan 51, that may be slid into the oven on the rails 50. That is the situation when the oven is to be used as a small oven. When the oven is expanded to its larger size by moving the panels 47, 47 to their vertical positions, the broiler pan 51 is then suspended between rails or flanges 53 formed on the inner surface of each panel 47. The back edge of each panel 47 is shown with a rear panel 47' which in the closed position serves to shield the rear wall 38 of the oven liner, and in the vertical, open position of FIGS. 3 and 4 create a rear wall of the expanded oven.

Figure 4:
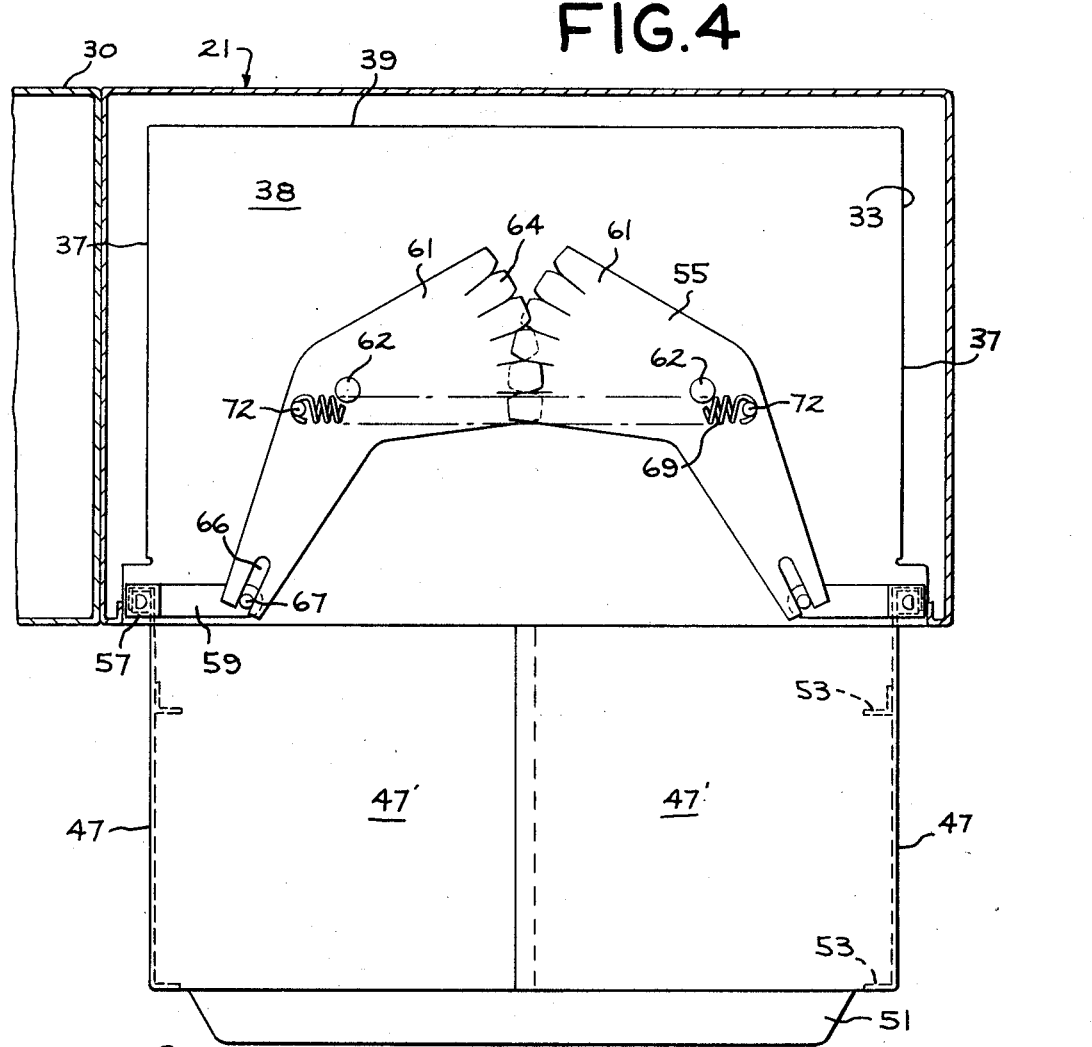
FIG. 4 is a back, cross-sectional, elevational view of the oven of FIG. 3 taken on the line 4—4 thereof, and showing the counterbalance mechanism for the movable bottom panels.

It is well to provide some means for supporting the hinged panels 47 in the two extreme positions; namely, the horizontal position of FIG. 2 and the vertical position of FIGS. 1, 3 and 4. One satisfactory means is best shown in the rear view of FIG. 4; namely, an overcenter counterbalance spring mechanism identified by reference numeral 55. First, it must be understood that each panel 47 is supported on a hinge rod 57 as is best seen in FIG. 2, and this rod would be supported at its opposite ends from the oven liner 33 as shown in FIG. 3. Each hinge rod 57 has a crank arm 59 fastened on the rear end of the rod just outside the back wall 38 of the oven liner. This crank arm is disposed at a 90° angle with respect to the plane of the panel 47 as is seen in FIG. 4. The back wall 38 of the oven liner carries a pair of segmental gears 61, 61 which are each supported adjacent their center about a fixed pivot pin 62. Each gear is of sheet metal construction and has a series of oppositely formed teeth 64 which are adapted to mesh with the corresponding teeth of the other segmental gear 61. The end of the segmental gear opposite the teeth 64 is provided with an elongated slot 66 and this is adapted to slide over a pin member 67 formed at the free end of the crank arm 59 to give a loose pin and slot connection. A strong coil spring 69 is connected between the two segmental gears 61 at a point adjacent the pivotal axis of the pivot pins 62 to provide an overcenter device. Each end of the coil spring 69 is fastened over a fixed pin 72 carried by one of the segmental gears 61. Thus in order to change the position of the movable panels 47, 47 it is merely necessary to grasp one of the panels and move it in the direction in which it is to be moved. This movement is transmitted through the segmental gears to the other panel 47 and is against the tension force of the spring 69 of the counterbalance mechanism. Once the spring is shifted past the imaginary line drawn between the two pivot pins 62 of the segmental gears 61, the spring 69 serves to assist in moving the panels in the desired direction until the panels reach their opposite extreme position where they are again held in place by the action of the spring. Admittedly, this counterbalance mechanism is only one of many possibilities for accomplishing the same result, as is merely given as a preferred embodiment.

The oven cavity 32 is provided with a top heating element or broil unit 74 in the form of a metal sheathed electrical resistance heating element of serpentine shape which is supported near the front of the oven by a hinger member 75 of wire form that is connected at its opposite ends to the sidewalls 37, 37 of the oven liner. The back portion of the broil unit 74 is the terminal end 77 of the heating unit and it extends through suitable openings in the back wall 38 where electrical power leads 78 may be connected to the unit terminals by means of attaching screws 79 or the like.

The broil unit 74 is spaced away from the oven exhaust vent 40 in the top wall 39 of the oven liner by a distance which will allow the installation of a grease filter 81, such as of fine mesh woven aluminum strips, which is supported in a surrounding metal frame 82. Across the bottom face of the grease filter 81 are a plurality of reflectors or shielding surfaces 83 which are centered above the turns of the broil unit 74 such that the radiant energy from the unit is deflected away from the grease filter 81 and is directed in a downward direction toward the food to be cooked in the oven. Grease filter 81 is a removable element that is supported on rails 85 on the opposite sidewalls 37, 37 of the oven liner. By opening the oven door 42 to its full open position, the grease filter may be slid forwardly until it is completely out of the oven where it may be carried to the kitchen sink and washed.

Notice that relatively cool room air may enter the air channels 35 from beneath the oven and pass over the outside of the oven liner. The oven exhaust may pass between the reflective or shielding portion 83 of the grease filter 81 and out through the filter medium and out the oven exhaust vent 40 until reaching the air channels 35 where they are drawn by the hood fan through an opening 87 in a side partition 88 that separates the broiler oven 21 from the ventilating hood 22.

Figure 5:
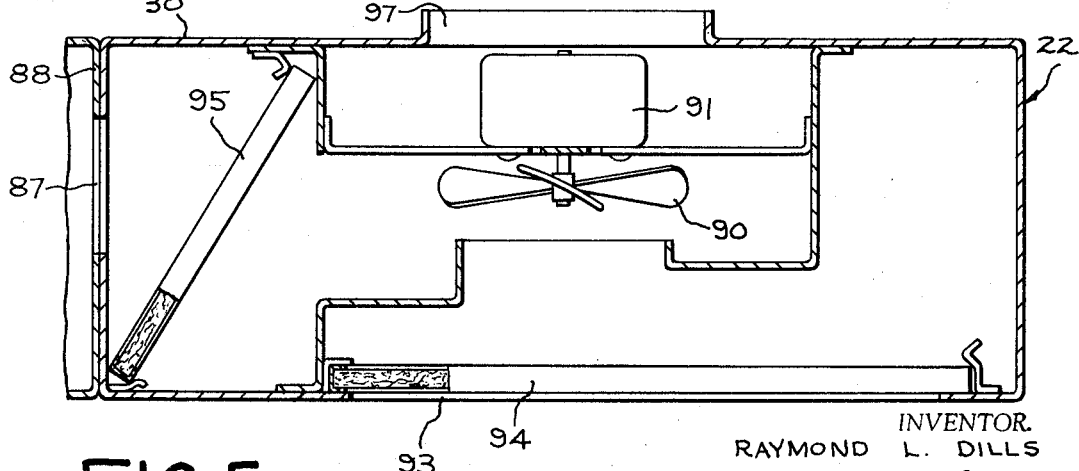
FIG. 5 is a front, cross-sectional, elevational view through the ventilating hood taken on the line 5—5 of FIG. 1.

A schematic diagram of the inner workings of the ventilating hood 22 is shown in FIG. 5. There is a hood blower or fan member 90 supported within the hollow housing 30 of the hood and it is powered by a fan motor 91. The primary function of the hood is to draw air from the area above the cooktop 11. The hood has a large air inlet opening 93 in its bottom portion that is covered by a grease filter 94. Moreover, there is another grease filter 95 disposed between the discharge opening 87 in the broiler oven 21 and the hood fan 90. It is desirable to protect the fan and its motor from the accumulation of grease and food soil by using cleanable or renewable filter elements, as is well understood by those skilled in this art. A discharge vent 97 is formed in the top wall of the ventilating hood 22 so that the hood may be vented to the outside of the kitchen. Of course, it would also be possible to provide additional filtering means so that the hood may be a recirculating or ductless hood that is not vented to the outside of the kitchen.

Modifications of this invention will occur to those skilled in this art. Therefore it is to be understood that this invention is not limited to the particular embodiments disclosed, but that it is intended to cover all modifications which are within the true spirit and scope of this invention as claimed.

What I claim as new and desired to secure by Letters Patent of the United States is:

1. A combination kitchen ventilating hood and broiler oven comprising a hood shell with a broiler oven mounted at one end thereof, the hook shell including air movement means for drawing air from both beneath the hood and from the broiler oven, and exhaust duct means for discharging the air from the hood shell, and air filtering means between the broiler oven and the air movement means and between the air intake beneath the hood and the air movement means, the broiler oven having a cooking cavity formed by a box-like oven liner enclosed by an outer shell, both the oven liner and the outer shell each having a top wall, opposite side walls, a rear wall and an open bottom wall and an open front wall, the outer shell supporting an oven door for closing the oven liner, the opposite side walls of the oven liner including means for adjustably supporting a food-supporting device, heating means located in the top portion of the oven liner for cooking foods placed within the oven, movable panels in one position supported horizontally adjacent the bottom of each sidewall of the oven liner and each covering substantially half of the bottom opening of the oven liner, each movable panel being adjustable to a second position in a downwardly hanging position forming a downward extension of the sidewalls, each movable panel including means for adjustably supporting a food-supporting device from the panels when they are in the said second position, a first vent means in the oven liner and a second vent means in the outer shell leading into the ventilating hood.

2. A combination kitchen ventilating hood and broiler oven as recited in claim 1 wherein each movable panel includes a back flange of a size such that when the panel is in its hanging position the two opposing flanges substantially close the back portion of the bottom extension of the broiler oven.

3. A combined broiler oven and kitchen ventilating hood comprising a broiler oven having a cooking cavity formed by a box-like oven liner and a front-opening access door, an outer shell surrounding the top, the two sides and the back of the oven liner, means for supporting a food-bearing device from the opposite sidewalls of the oven liner, the bottom walls of the oven liner being formed by a pair of movable panels and each having a first horizontal position joined with the bottom edge of the adjacent sidewall, and a second vertical position serving as a downward extension of the sidewalls, means on said downwardly extending panels for supporting a food-bearing device so as to close the bottom of the cooking cavity, a heating means located adjacent the top wall of the oven liner, an oven exhaust vent located in the oven liner emptying into the outer shell, the outer shell having an exhaust vent emptying into the ventilating hood, said ventilating hood comprising a hood shell including an air movement means for drawing air from beneath both the hood and from the exhaust vent of the outer shell of the broiler oven, the hood shell also including an exhaust duct means for discharging air from the hood shell.

4. A combined broiler oven and kitchen ventilating hood as recited in claim 3 wherein the assembly is adapted to hang in a cantilever fashion at generally eye-height where there are no obstructions beneath the broiler oven to interfere with the downward extension of the movable panels.

5. A domestic cooking appliance having a cooktop with an integral high-rise backsplash; wherein the invention comprises a combined broiler oven and a kitchen ventilating hood supported from the top of the backsplash in a cantilever fashion, the broiler oven having a cooking cavity formed by a box-like oven liner and a front-opening access door, a food-supporting device adapted to be supported from the opposite side walls of the oven liner, the bottom wall of the oven liner being formed by movable panel means having a first horizontal position substantially closing the bottom of the oven liner and a second vertical position serving as a downward extension of the oven liner and creating an open bottom to an enlarged cooking cavity, a food-supporting device adapted to be supported from the downwardly extending movable panel means, a heating means located adjacent the top wall of the oven liner, an oven exhaust vent located adjacent the top of the oven and discharging into the ventilating hood, said hood comprising a hollow housing with an air intake opening in its bottom portion for collecting food odors and vapors from the area above the cooktop, an air blower means within the housing for drawing air from both the area above the cooktop and the broiler oven, the housing also having an exhaust duct means downstream of the blower means for carrying off the air flow from the hood.

6. A domestic cooking appliance as recited in claim 5 wherein the movable panel means comprises a pair of panels each hingedly connected to one of the opposite sidewalls of the oven liner, an over-center counterbalance mechanism outside the oven liner joining together the two panels, said counterbalance mechanism having two extreme positions which coincide with the first horizontal position and the second vertical position of the panels.

7. A domestic cooking appliance as recited in claim 5 with the said oven exhaust vent located in the top wall above the said heating means, a grease filter positioned between the heating means and the oven exhaust means, said grease filter including heat reflecting surfaces overlying the heating means to direct most of the radiant energy from the heating means in a downward direction toward the food to be cooked.

8. A broiler oven having a cooking cavity formed by a box-like oven liner and a front-opening access door, said oven liner having a movable bottom wall, opposite sidewalls, a back wall, a top wall and an open front adapted to be closed by the said access door, a removable food-supporting shelf supported from the opposite sidewalls of the oven liner, said movable bottom wall comprising a pair of movable panels each connected to one of the opposite sidewalls of the oven liner, said panels having a first horizontal position substantially closing the bottom of the oven liner and a second vertical position serving as a downward extension of the vertical walls of the oven liner with an open bottom creating an enlarged cooking cavity, a removable food-supporting shelf adapted to be supported from the downwardly extending movable panels, a heating means located adjacent the top wall of the oven liner, and an oven exhaust vent located in the top of the oven for carrying off the oven gases.

9. The subcombination of a broiler oven as recited in claim 8 with the addition of a counterbalance mechanism behind the backwall of the oven liner joining the two movable panels, said counterbalance mechanism having means for holding the panels steady in both the first horizontal position and the second vertical position.

10. The subcombination of a broiler oven as recited in claim 9 wherein the said oven exhaust vent is located in the top wall of the oven liner, and a grease filter positioned between the heating means and the oven exhaust vent, said grease filter including heat reflecting surfaces overlying the heating means to deflect most of the radiant energy from the heating means in a downward direction.

11. The subcombination of a combined broiler oven and kitchen ventilating hood wherein the broiler oven has a hollow housing with a cooking cavity formed by an oven liner and a front-opening access door, said oven liner having a movable bottom wall, opposite sidewalls, a back wall, a top wall and an open front that is adapted to be closed by the front door, a removable food-supporting shelf adapted to be supported from the opposite sidewalls of the oven liner, an electrical resistance heating element located adjacent the top wall of the oven liner, said movable bottom wall being capable of relocation into vertical hung segments which create an extended cooking gravity with an open bottom, a removable food-supporting shelf adapted to be supported from the said vertical hung segments of the movable bottom wall, an oven exhaust vent in the top portion of the oven, the said ventilating hood having a hollow housing equipped with a blower means associated with the broiler oven for drawing air into the housing from both beneath the hood and from the oven exhaust vent of the broiler oven, and a hood exhaust vent cooperating with the blower means for drawing off air from the hood.

12. The subcombination of a combined broiler oven and kitchen ventilating hood as recited in claim 11 wherein the movable bottom wall comprises a pair of hinged panels each supported at the bottom portion of the sidewalls respectively, and linkage means outside the oven liner joining the two hinge panels whereby the movement of one panel is coordinated with the movement of the other panel, said linkage means including a two-position holding means for locking the hinge panel in either a raised horizontal position or a lowered vertical position.

13. The subcombination of a broiler oven and a kitchen ventilating hool as recited in claim 12 wherein each of the said hinge panels has a right angular member along the rear edge thereof, and each member lies in a vertical plane adjacent the back wall of the oven liner, so that when the hinge panels are in their lower vertical position the right angular members cooperate to form a downward extension of the back wall of the oven liner.

14. A combination broiler oven and kitchen ventilating hood adapted to be supported in an elevated position above a counter-high cooking appliance; the invention comprising a hollow divided housing with a broiler oven at one end and a connecting ventilating hood at the other end for carrying off the exhaust from the broiler oven and for ventilating the area above the said kitchen appliance, the broiler oven having a cooking cavity formed by a box-like oven liner and a front-opening access door, the oven liner having opposite sidewalls, a back wall, a top wall and a split bottom wall formed by a pair of movable panels each supported adjacent the lower portion of one of the sidewalls respectively, the movable panels having a first horizontal position forming an oven bottom wall and a second vertical position to form a downward extension of the opposing sidewalls, a food-supporting shelf adapted to be supported in one position from the opposing sidewalls, and in a second position from the downwardly extending movable panels, a metal sheathed resistance heating element located adjacent the top wall of the oven liner, cooling air ducts within the housing surrounding the vertical and top walls of the oven liner, an oven exhaust vent located in the oven liner and emptying into the cooling ducts, a discharge vent opening connecting the cooling ducts to the hood portion of the housing, said hood having an air blower means supported within the housing for drawing air from the said discharge vent opening and from beneath the hood, and a hood discharge vent downstream of the blower means for carrying off the hood gases, and grease filtering means across the intake to the air blower means.

15. A combination broiler oven and kitchen ventilating hood as recited in claim 14 with the oven exhaust vent located in the top wall of the oven liner, a grease filtering element positioned between the said heating element and the oven exhaust vent, said filtering element including heat shielding surfaces overlying the heating element and shielding the filtering element from the radiant energy of the heating element as well as directing most of the radiant energy from the heating element in a downward direction.

16. A combination broiler oven and kitchen ventilating hood as recited in claim 15 wherein the pair of movable panels forming the slit bottom wall of the oven liner are connected together by over-center linkage members for locking the panels in either their first horizontal position or their second vertical position.

References Cited

UNITED STATES PATENTS

| | | | |
|---|---|---|---|
| 2,207,307 | 7/1940 | Teller et al. | 126—41 |
| 3,233,606 | 2/1966 | Turner et al. | 126—299 |
| 3,263,593 | 8/1966 | Appleman | 126—41 X |

FOREIGN PATENTS

| | | |
|---|---|---|
| 744,518 | 2/1956 | Great Britain. |

CHARLES J. MYHRE, Primary Examiner

U.S. Cl. X.R.

126—21, 41, 299